US008703638B2

(12) United States Patent
Wakizaka et al.

(10) Patent No.: US 8,703,638 B2
(45) Date of Patent: Apr. 22, 2014

(54) PROCESS FOR PRODUCTION AND USE OF CARBONITRIDE MIXTURE PARTICLES OR OXYCARBONITRIDE MIXTURE PARTICLES

(75) Inventors: Yasuaki Wakizaka, Chiba (JP); Toshikazu Shishikura, Chiba (JP)

(73) Assignee: Showa Denko K.K., Tokyo (JP)

( * ) Notice: Subject to any disclaimer, the term of this patent is extended or adjusted under 35 U.S.C. 154(b) by 171 days.

(21) Appl. No.: 13/122,530

(22) PCT Filed: Oct. 6, 2009

(86) PCT No.: PCT/JP2009/067411
§ 371 (c)(1),
(2), (4) Date: Apr. 4, 2011

(87) PCT Pub. No.: WO2010/041658
PCT Pub. Date: Apr. 15, 2010

(65) Prior Publication Data
US 2011/0183234 A1    Jul. 28, 2011

(30) Foreign Application Priority Data
Oct. 6, 2008    (JP) .................................. 2008-259416

(51) Int. Cl.
*B01J 27/22*   (2006.01)
*B01J 27/24*   (2006.01)
*C23C 14/30*   (2006.01)
*C23C 16/00*   (2006.01)
*B05D 3/00*    (2006.01)
*B05D 3/02*    (2006.01)
*H05B 7/00*    (2006.01)

(52) U.S. Cl.
USPC ... 502/177; 502/200; 427/249.1; 427/249.19; 427/255.23; 427/255.28; 427/299; 427/394; 427/596

(58) Field of Classification Search
USPC ................. 502/177, 200; 427/249.1, 249.19, 427/255.23, 255.28, 299.394, 596, 299, 394
See application file for complete search history.

(56) References Cited

U.S. PATENT DOCUMENTS 3,615,271 A * 10/1971 Dietz .............................. 423/371
3,772,058 A * 11/1973 Bloom ..................... 427/249.19
(Continued)

FOREIGN PATENT DOCUMENTS

EP    0 124 901 A2    11/1984
EP    2 258 475 A1    12/2010
(Continued)

OTHER PUBLICATIONS

"Partially oxidized titanium carbonitride as a non-noble catalyst for oxygen reduction reactions," Duc Tai Dam et al. International Journal of Hydrogen Energy 37 (2012), pp. 15135-15139.*
(Continued)

*Primary Examiner* — Patricia L Hailey
(74) *Attorney, Agent, or Firm* — Sughrue Mion, PLLC

(57) ABSTRACT

The invention has an object of providing catalysts that are not corroded in acidic electrolytes or at high potential, have excellent durability and show high oxygen reducing ability. An aspect of the invention is directed to a process wherein metal carbonitride mixture particles or metal oxycarbonitride mixture particles are produced from an organometallic compound of a Group IV or V transition metal, a metal salt of a Group IV or V transition metal, or a mixture of these compounds using laser light as a light source.

11 Claims, 6 Drawing Sheets

(56) References Cited

U.S. PATENT DOCUMENTS

| | | | | |
|---|---|---|---|---|
| 3,783,007 | A | * | 1/1974 | Bloom et al. ............... 148/212 |
| 3,951,870 | A | * | 4/1976 | Economy et al. ............ 252/506 |
| 4,247,529 | A | * | 1/1981 | Mori et al. .................. 423/371 |
| 4,333,916 | A | * | 6/1982 | Iwai et al. ................... 423/371 |
| 4,556,416 | A | | 12/1985 | Kamijo et al. |
| 5,756,410 | A | * | 5/1998 | Dunmead et al. ........... 501/96.1 |
| 6,168,694 | B1 | * | 1/2001 | Huang et al. ............. 204/290.12 |
| 2010/0227253 | A1 | | 9/2010 | Monden et al. |
| 2010/0331172 | A1 | * | 12/2010 | Monden et al. .............. 502/174 |
| 2011/0008709 | A1 | | 1/2011 | Shishikura et al. |
| 2011/0020729 | A1 | | 1/2011 | Monden et al. |
| 2011/0053040 | A1 | | 3/2011 | Monden et al. |
| 2011/0053049 | A1 | | 3/2011 | Imai et al. |
| 2011/0059386 | A1 | | 3/2011 | Monden et al. |
| 2012/0065052 | A1 | * | 3/2012 | Ewald et al. ...................... 502/5 |
| 2012/0094207 | A1 | * | 4/2012 | Wakizaka et al. ............ 429/482 |
| 2012/0270135 | A1 | * | 10/2012 | Kurozumi ..................... 429/482 |

FOREIGN PATENT DOCUMENTS

| | | |
|---|---|---|
| JP | 59-206042 A | 11/1984 |
| JP | 3-141107 A | 6/1991 |
| JP | 2005-504701 T | 2/2005 |
| JP | 2006-164658 A | 6/2006 |
| JP | 2006-298681 A | 11/2006 |
| JP | 2007-031781 A | 2/2007 |
| JP | 2007-257888 A | 10/2007 |
| JP | 2008-108594 A | 5/2008 |
| JP | 2008-121039 A | 5/2008 |
| JP | 2009-226311 A | 10/2009 |
| WO | 03/029145 A1 | 4/2003 |
| WO | 2009/031383 A1 | 3/2009 |
| WO | 2009/091043 A1 | 7/2009 |
| WO | 2009/091047 A1 | 7/2009 |
| WO | 2009/107518 A1 | 9/2009 |
| WO | 2009/119497 A1 | 10/2009 |
| WO | 2009/119523 A1 | 10/2009 |

OTHER PUBLICATIONS

"Oxygen reduction reaction activity of nitrogen-doped titanium oxide in acid media," Mitsuharu Chisaka, et al. Electrochimica Acta 88 (2013), pp. 697-707.*

Ohgi, et al., "Catalytic activity of partially-oxidized transition metal carbonitrides for oxygen reduction reaction", The Electrochemical Society of Japan, summary of lecture No. 74, Mar. 29, 2007, p. 94.

Supplementary European Search Report dated Jan. 31, 2014, issued in corresponding European Application No. 09 81 9192.7.

Pan et al., "Reactive Synthesis of Titanium Carbonitride and Composite Materials Thereof," Chongqing University Press, 1991.

* cited by examiner

PROCESS FOR PRODUCTION AND USE OF CARBONITRIDE MIXTURE PARTICLES OR OXYCARBONITRIDE MIXTURE PARTICLES

CROSS REFERENCE TO RELATED APPLICATION

This application is a National Stage of International Application No. PCT/JP2009/067411 filed Oct. 6, 2009, claiming priority based on Japanese Patent Application No. 2008-259416, filed Oct. 6, 2008, the contents of all of which are incorporated herein by reference in their entirety.

TECHNICAL FIELD

The present invention relates to processes for the production and uses of metal carbonitride mixture particles or metal oxycarbonitride mixture particles. The metal carbonitride mixture particles or metal oxycarbonitride mixture particles obtained by the processes of the invention can be used in the fields of such technologies as photocatalysts, solar cells, phosphors and quantum dots.

BACKGROUND ART

Carbonitrides are used to form coatings on the surface of metal tools mainly in order to improve mechanical properties, in particular abrasion resistance and chipping properties. Continuous research has been carried out with a view toward developing compositions giving better properties such as mechanical stability.

Not only in tools, the application of carbonitrides is expected in electronic materials because of their excellent electron conductivity and thermal stability.

In a known process for the production of carbonitrides as described in Patent Literature 1, carbonitride is directly deposited on the surface of a metal. However, it is difficult according to this process that the carbonitride is obtained as powder. Processing such carbonitrides to different shapes in later steps is difficult.

Patent Literature 2 has developed a method for synthesizing carbonitride as particles. However, the particles obtained are large with the minimum size being approximately 1 μm and cannot be used for catalysts or electronic materials requiring miniaturization.

Patent Literature 3 discloses a process of producing aluminum oxide nanoparticles by a laser pyrolysis method. However, the reference is silent with respect to the production of carbonitride mixture particles or oxycarbonitride mixture particles of Group IV or V transition metals.

CITATION LIST

Patent Literatures

Patent Literature 1: JP-A-2008-121039
Patent Literature 2: JP-A-2006-298681
Patent Literature 3: JP-A-2005-504701

SUMMARY OF INVENTION

Technical Problem

It is an object of the invention to solve the above problems and to provide processes capable of producing industrially important carbonitride mixture particles or oxycarbonitride mixture particles with high quality.

Solution to Problem

The present inventors studied diligently to solve the problems described hereinabove, and have completed the present invention.

For example, the present invention is concerned with the following (1) to (18).

(1) A process for producing metal carbonitride mixture particles or metal oxycarbonitride mixture particles, wherein a reaction gas obtained by mixing an organometallic compound or a metal salt of a Group IV or V transition metal, or a mixture of these compounds, with a nitrogen source and optionally a carbon source and an oxygen source as required, and with a diluent gas, is heated to produce carbonitride mixture particles or oxycarbonitride mixture particles of the metal, and wherein the heating involves laser light as a heat source.

(2) The process for producing metal carbonitride mixture particles or metal oxycarbonitride mixture particles as described in (1), wherein two or more laser lights are used as heat sources.

(3) The process for producing metal oxycarbonitride mixture particles as described in (2), wherein carbonitride mixture particles are formed by heating with first laser light, and thereafter the carbonitride mixture particles are reacted with the oxygen source by heating with second laser light to give oxycarbonitride mixture particles.

(4) The process for producing metal carbonitride mixture particles or metal oxycarbonitride mixture particles as described in any one of (1) to (3), wherein the average particle diameter is 1 to 100 nm.

(5) The process for producing metal carbonitride mixture particles or metal oxycarbonitride mixture particles as described in any one of (1) to (4), wherein the Group IV or V transition metal is at least one selected from the group consisting of niobium, titanium and zirconium.

(6) The process for producing metal carbonitride mixture particles or metal oxycarbonitride mixture particles as described in any one of (1) to (5), wherein the organometallic compound is at least one selected from the group consisting of alkyl metals, metal alkoxides, metal chelates and metal carbonyls.

(7) The process for producing metal carbonitride mixture particles or metal oxycarbonitride mixture particles as described in any one of (1) to (5), wherein the metal salt is at least one selected from the group consisting of metal chlorides, metal bromides, metal iodides, metal oxychlorides, metal oxybromides and metal oxyiodides.

(8) The process for producing metal carbonitride mixture particles or metal oxycarbonitride mixture particles as described in any one of (1) to (5), wherein the metal salt is at least one selected from the group consisting of acetate salts, nitrate salts, sulfate salts, carbonate salts and ammonium carbonate salts.

(9) The process for producing metal carbonitride mixture particles or metal oxycarbonitride mixture particles as described in any one of (1) to (8), wherein the carbon source is at least one selected from the group consisting of fine carbon powders, hydrocarbons, alcohols, ketones, aldehydes, carboxylic acids and nitriles.

(10) The process for producing metal carbonitride mixture particles or metal oxycarbonitride mixture particles as described in anyone of (1) to (9), wherein the nitrogen source is at least one selected from the group consisting of ammonia, nitrogen, hydrazine and nitriles.

(11) The process for producing metal carbonitride mixture particles or metal oxycarbonitride mixture particles as described in any one of (1) to (10), wherein the oxygen source is at least one selected from the group consisting of oxygen, water, alcohols, ketones, aldehydes and carboxylic acids.

(12) The process for producing metal carbonitride mixture particles or metal oxycarbonitride mixture particles as described in any one of (1) to (11), wherein the diluent gas is argon, nitrogen, hydrogen or a mixture thereof.

(13) A fuel cell catalyst that comprises metal carbonitride mixture particles or metal oxycarbonitride mixture particles obtained by the process described in anyone of (1) to (12).

(14) The fuel cell catalyst described in (13), further comprising electron conductive particles.

(15) An electrode comprising a fuel cell catalyst layer and a porous support layer, wherein the fuel cell catalyst layer comprises the fuel cell catalyst described in (13) or (14).

(16) A membrane electrode assembly comprising a cathode, an anode and an electrolyte membrane interposed between the cathode and the anode, wherein the cathode and/or the anode is the electrode described in (15).

(17) A fuel cell comprising the membrane electrode assembly described in (16).

(18) A polymer electrolyte fuel cell comprising the membrane electrode assembly described in (16).

Advantageous Effects of Invention

According to the production processes of the present invention, carbonitride mixture particles or oxycarbonitride mixture particles may be obtained which have small particle diameters of 1 to 100 nm and a uniform particle size distribution and a uniform composition distribution. The particles exhibit excellent properties as catalysts, in particular fuel cell catalysts.

In the case of fuel cell catalysts as an example, smaller particle diameters provide a larger surface area and consequent higher catalytic performance. Further, smaller particle diameters facilitate the formation of catalyst-ion exchange membrane assemblies (MEA) by application methods and can increase the contact area between layers, thereby reducing the contact resistance in the assemblies.

DESCRIPTION OF EMBODIMENTS

Figure 1:
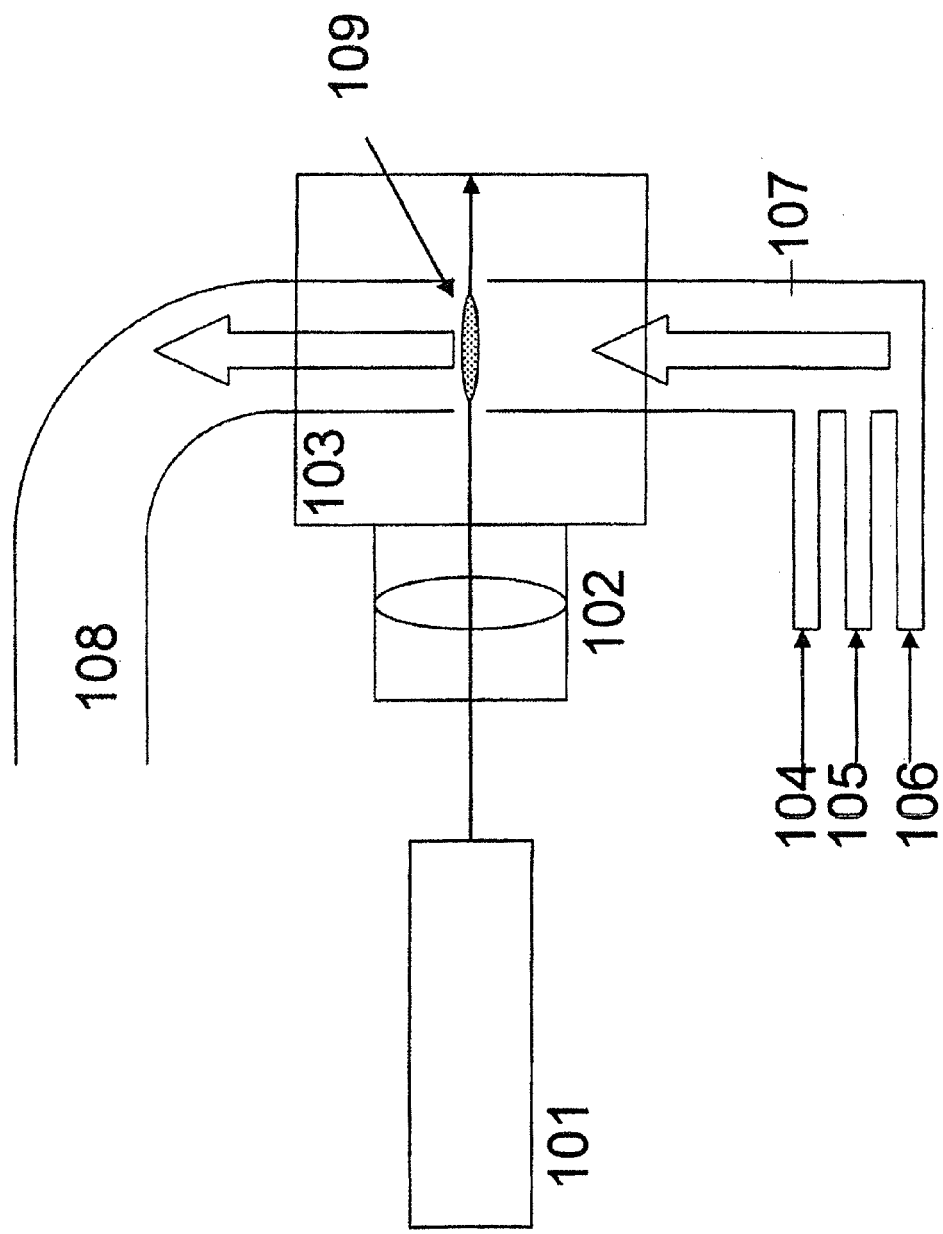
FIG. 1 is a schematic view of an example of a laser pyrolysis apparatus.

Hereinbelow, embodiments of the production processes for metal carbonitride mixture particles or metal oxycarbonitride mixture particles according to the present invention will be described with appropriate reference to FIG. 1.

However, the present invention is not limited to the embodiments described hereinbelow; for example, constituent elements in these embodiments may be combined together appropriately.

The present invention pertains mainly to processes for producing carbonitride mixture particles or oxycarbonitride mixture particles. In the invention, the carbonitrides refer to compounds that are shown to contain a metal, carbon, nitrogen and substantially no oxygen when analyzed at least by elemental analysis, and the oxycarbonitrides are compounds that are found to contain a metal, carbon, nitrogen and oxygen when analyzed at least by elemental analysis.

The oxycarbonitride mixture particles show one or more peaks between 33° and 43° in a diffraction pattern obtained with an X-ray diffractometer (XRD). However, it is difficult to identify whether the oxycarbonitride mixture particles are a carbonitride having interstitial oxygen in part of the crystal lattices (hereinafter, the interstitial oxygen compound(s)), a mixture of a carbonitride and an oxide from the oxidation of the metal contained in the carbonitride, a mixture of substances including a carbonitride, an oxide and an interstitial oxygen compound, or a mixture of a metal carbonitride and a compound having a structure of an oxide of the identical metal in which part of the oxygen atoms in the oxide are partially substituted with carbon and nitrogen.

Thus, in the present specification, particles of a mixture mainly composed of carbonitride will be referred to as the carbonitride mixture particles, and particles of a mixture mainly composed of oxycarbonitride will be referred to as the oxycarbonitride mixture particles. It is needless to mention that the carbonitride mixture particles or the oxycarbonitride mixture particles may be pure carbonitride particles or pure oxycarbonitride particles, respectively.

The average particle diameter (d) of the particles synthesized according to the invention indicates an average primary particle diameter that is determined from the equation (1) below based on the specific surface area measured by a BET method assuming that the particles are sphere.

[Math. 1]

$$d = 0.006/(\rho S) \qquad (1)$$

In the equation, d is the average particle diameter (unit: nm), $\rho$ is the true density of the particles (unit: $g/cm^3$), and S is the specific surface area of the particles (unit: $m^2/g$).

Herein, for simplicity, the true density of metal carbonitride is that of carbide of the metal, and the true density of metal oxycarbonitride is that of oxide of the metal.

In the invention, organometallic compounds, metal salts or compounds including these compounds are used as material compounds for metals. These materials will also be collectively referred to as the metal compound materials hereinbelow.

In the production processes for metal carbonitride mixture particles or metal oxycarbonitride mixture particles according to the invention, a reaction gas obtained by mixing an organometallic compound or a metal salt of a Group IV or V transition metal, or a mixture of these compounds, with a nitrogen source and optionally a carbon source and an oxygen source as required, and with a diluent gas, is heated to produce carbonitride mixture particles or oxycarbonitride mixture particles of the metal. In the process, the heating involves laser light as a heat source. The production processes may be carried out using, for example, a laser pyrolysis apparatus described below.

[Overall Structure 1 of Laser Pyrolysis Apparatus]

FIG. 1 is a schematic view showing an embodiment of a laser pyrolysis apparatus used in the production process of the invention. In FIG. 1, the numeral 101 indicates a laser, 102 a condensing lens, 103 a chamber, 104 a carrier gas/oxygen source inlet, 105 a metal compound material/carbon source inlet, 106 a nitrogen source inlet, 107 a reaction gas inlet, 108 a product outlet, and 109 a reaction zone.

In this laser pyrolysis apparatus, a carrier gas is introduced from the carrier gas inlet 104, a metal compound material and a carbon source are fed from the metal compound material/carbon source inlet 105, and a nitrogen source is introduced from the nitrogen source inlet 106. They are mixed together at the reaction gas inlet 107 to form a reaction gas, which is supplied into the chamber 103. Laser light emitted from the laser 101 passes through the condensing lens 102 and irradiates the reaction gas in the chamber 103. The reaction zone is defined by a portion of the reaction gas which is being irradiated with the laser light. At the reaction zone, the reaction gas is heated by the laser light as a heat source and generates carbonitride mixture particles. The carbonitride mixture particles are delivered outside the chamber 103 through the product outlet 108.

In the case where the metal compound material, the carbon source, the nitrogen source and the oxygen source that are to be supplied are liquid at normal temperature, the materials should be heated and vaporized beforehand in a quartz furnace or the like. In such cases, it is necessary that the carrier gas too is heated beforehand and the entire of the production reaction system is maintained at or above the boiling points. It is desired that the materials that are supplied have been heated at temperatures at least 20° C. higher than the boiling points of the material substances.

When the materials are solid, they may be dispersed in a solvent and be sprayed together with the carrier gas using a two-fluid nozzle. However, gaseous materials tend to give particles having smaller primary particle diameters and smaller agglomerated particle diameters. Therefore, the present invention is desirably achieved by the gas-gas phase reaction wherever possible.

The laser lights used in the invention may be any known laser lights. In particular, $CO_2$ laser light is more preferable because it allows for efficient absorption of laser energy by gases that absorb infrared radiation. Examples of the gases absorbing infrared radiation include ethylene, isopropyl alcohol, ammonia, silane, ozone and sulfur hexafluoride. In a more preferred embodiment, ammonia is used as the gas for absorbing the laser light because it can also serve as a nitrogen source for the production of carbonitride mixture particles or oxycarbonitride mixture particles.

The laser power is not particularly limited. However, because the production of carbonitride mixture particles or oxycarbonitride mixture particles requires high temperatures and high-power lasers are preferable for mass production, the laser power is preferably in the range of 100 W to 100 kW. The use of lasers having a power level exceeding 100 kW does not cause any problems but increases costs in industrial applications. The laser power is more preferably from 200 W to less than 10 kW, and still more preferably from 500 W to less than 5 kW.

The carrier gas as a diluent gas is preferably argon, nitrogen, hydrogen, or a mixture containing two or more of these gases. The carrier gas is fed from the carrier gas inlet and is mixed with the metal compound material and introduced into the chamber.

The carrier gas represents a large proportion of the volume of a reaction gas resulting from the mixing of the carrier gas, the metal compound material and the nitrogen source. Accordingly, the flow rate can be controlled by adjusting the flow rate of the carrier gas.

When the carrier gas is introduced into the furnace, it will have a volume differing from that under the standard conditions depending on the relation between the furnace temperature and the pressure. However, for operation simplicity, the operation conditions are usually controlled based on the gas feed amount under the standard conditions. With regard to the carrier gas flow rate in the invention, it tends to be that the obtainable carbonitride mixture particles or oxycarbonitride mixture particles are finer with decreasing average residence time which is obtained by dividing the chamber volume by the carrier gas flow rate. However, an excessively short average residence time causes a risk that unreacted metal compound material is discharged together with the product. Accordingly, the average residence time is desirably from 0.01 minutes to less than 500 minutes, more desirably from 0.1 minutes to less than 200 minutes, and still more desirably from 0.5 minutes to less than 30 minutes.

The metal that is contained in the metal compound material used in the processes of the invention is preferably a Group IV or V transition metal in the periodic table, and is more preferably at least one selected from niobium, titanium and zirconium.

In the case where $CO_2$ laser light is used as a heat source, the organometallic compounds used as the metal compound materials in the processes of the invention are not particularly limited as long as the organometallic compounds absorb infrared radiation. Specific examples include metal alkoxides such as ethoxides, propoxides and butoxides, chelates such as acetyl acetonates, complexes analogous to the cyclopentadienyl structures, organic acid esters, glycolates, alkoxide polycondensation oligomers, alkyl metals and metal carbonyls.

In more detail:

The niobium compounds include niobium methoxide, niobium butoxide, niobium ethoxide, niobium phenoxide, bis(methylcyclopentadienyl)niobium dichloride, cyclopentadienylniobium tetrachloride, niobium 2-ethylhexanoate, tetrakis(2,2,6,6-tetramethyl-3,5-heptanedionato)niobium and dichlorotrimethylniobium. Of these, niobium ethoxide and niobium butoxide are preferable from the viewpoints of material costs and balance between carbon and metal element.

The titanium compounds include titanium propoxide, titanium butoxide, titanium tetra-2-ethylhexoxide, titanium propoxyoctylene glycolate, di-propoxy bis(acetylacetonato) titanium, propanedioxytitanium bis(ethylacetoacetate), tri-normal-butoxytitanium monostearate, di-isopropoxytitanium di-stearate, titanium stearate, di-isopropoxytitanium di-isostearate, (2-normal-butoxycarbonylbenzoyloxy) tributoxytitanium, di-normal-butoxy bis(triethanolaminato) titanium, titanium lactate, polyhydroxytitanium stearate and trimethyltitanium. Of these, titanium ethoxide and titanium butoxide are preferable from the viewpoints of material costs and balance between carbon and metal element.

The zirconium compounds include zirconium acetylacetone, zirconium ethoxide, zirconium (normal or tertiary) butoxide, zirconium propoxide, bis(cyclopentadienyl)dimethylzirconium, dimethyl bis(tertiary-butylcyclopentadienyl)zirconium, tetrabenzylzirconium, tetrakis(diethylamino)zirconium, tetrakis(ethylmethylamino)zirconium, tetrakis(2,2,6,6-tetramethyl-3,5-heptanedionato) zirconium, bis(tertiary-butylcyclopentadienyl) zirconium dichloride, bis(methylcyclopentadienyl) zirconium dichloride, bis(pentamethylcyclopentadienyl) zirconium dichloride and cyclopentadienylzirconium trichloride. Of these, zirconium ethoxide and zirconium butoxide are preferable from the viewpoints of material costs and balance between carbon and metal element.

The metal salts used as the metal compound materials in the processes of the invention are not particularly limited. Specific examples include halides such as niobium pentachloride, titanium tetrachloride, zirconium tetrachloride, niobium bromide, titanium bromide, zirconium bromide, niobium iodide, titanium iodide and zirconium iodide, and partial hydrolysates thereof such as niobium oxychloride, titanium oxychloride, zirconium oxychloride, niobium oxybromide, titanium oxybromide, zirconium oxybromide, niobium oxyiodide, titanium oxyiodide and zirconium oxyiodide.

Other metal salts are also usable, with examples including niobium acetate, titanium acetate, zirconium acetate, niobium nitrate, titanium nitrate, zirconium nitrate, niobium sulfate, titanium sulfate, zirconium sulfate, niobium carbonate, titanium carbonate, zirconium carbonate, ammonium zirconium carbonate, and partial hydrolysates thereof such as titanyl sulfate.

The metal compound material is fed from the metal compound material inlet and is introduced into the chamber as a mixture with the carrier gas. The metal compound material has an optimum feed rate. When fed at an excessively high rate, the metal compound material may remain unreacted in the product or the particles obtained may be increased in size. In contrast, an excessively low feed rate leads to lower productivity of the system.

The desired feed rate for the metal compound materials depends on the power of the laser. When a power between 500 W and 5 kW is selected, the feed rate per minute is desirably from 0.5 mmol to 1000 mmol, more desirably 1 mmol to 500 mmol, and still more desirably 3 mmol to 400 mmol.

When the organometallic compound is used as the metal compound material, the carbon from the compound is mainly used as a carbon source. However, an additional carbon source is used in the case of carbon shortage or where the metal compound material used is a metal salt that does not contain carbon. Such carbon sources are finely particulate carbons such as carbon blacks and activated carbons, hydrocarbons such as methane, ethane, propane, ethylene and acetylene, alcohols such as methanol, ethanol, propanol and butanol, ketones such as acetone, aldehydes such as formaldehyde and acetaldehyde, carboxylic acids such as formic acid and acetic acid, and nitriles such as acetonitrile. Of these, methane, methanol and acetonitrile are preferable.

When such additional carbon sources are supplied, the supply rate of the carbon sources per 1000 W laser power is desirably in the range of 0.001 carbon molar equivalents/min to 10 carbon molar equivalents/min, more preferably 0.01 carbon molar equivalents/min to 5 carbon molar equivalents/min, and still more preferably 0.2 carbon molar equivalents/min to 2 carbon molar equivalents/min. However, the optimum carbon molar equivalents vary in linear proportion to the laser power.

Preferred nitrogen sources are ammonia, nitrogen, hydrazine and nitriles such as acetonitrile. Ammonia is more preferable because of its high reactivity and relative stability. The nitrogen source is fed from the nitrogen source inlet and is introduced into the chamber as a mixture with the carrier gas.

When the nitrogen sources are supplied, the supply rate of the nitrogen sources per 1000 W laser power is desirably in the range of 0.01 nitrogen molar equivalents/min to 100 nitrogen molar equivalents/min, more preferably 0.05 nitrogen molar equivalents/min to 10 nitrogen molar equivalents/min, and still more preferably 0.1 nitrogen molar equivalents/min to 5 nitrogen molar equivalents/min. However, the optimum nitrogen molar equivalents vary in linear proportion to the laser power.

For the production of oxycarbonitrides, oxygen atoms need to be introduced. Exemplary oxygen sources are oxygen, water, alcohols such as methanol, ethanol, propanol and butanol, ketones such as acetone, aldehydes such as formaldehyde and acetaldehyde, and carboxylic acids such as formic acid and acetic acid. The oxygen source may be fed from the carrier gas inlet 104 of the laser pyrolysis apparatus illustrated in FIG. 1.

When the oxygen sources are supplied, the supply rate of the oxygen sources per 1000 W laser power is desirably in the range of 0.001 oxygen molar equivalents/min to 10 oxygen molar equivalents/min, more preferably 0.01 oxygen molar equivalents/min to 5 oxygen molar equivalents/min, and still more preferably 0.2 oxygen molar equivalents/min to 2 oxygen molar equivalents/min. However, the optimum oxygen molar equivalents vary in linear proportion to the laser power.

The inside of the chamber may be at any pressure level. However, a reduced pressure atmosphere is preferable because the reaction gas can be introduced into the chamber easily and the product can be collected easily.

The pressure inside the chamber is more preferably 1 to 700 Torr. A sufficient amount of the reactive gas is not reached at below 1 Torr, and efficient production of carbonitride particles or oxycarbonitride particles is difficult. Creating a reduced pressure atmosphere is difficult if the pressure is in excess of 700 Torr.

The laser light emitted from the laser may enter the chamber directly. It is however preferable to use a condensing lens in order to increase the temperature more efficiently. Further, a condensing lens can focus the energy exclusively to the reaction zone and thus prevents a temperature rise in other area. In particular, the prevention of temperature rise in other area is preferable because highly reactive gases such as ammonia are very likely to damage the chamber inner wall or glass windows at high temperatures.

On the other hand, the temperature decreases sharply in an area slightly distant from the light condensing zone to which the laser light is condensed by the condensing lens. As a result, the present apparatus using laser light can easily maintain the state of a mixture of substances that will undergo phase separation in usual electric sintering furnaces. In particular, the use of condensing lenses is very effective means when improved catalytic properties are to be achieved by forming a solid solution of niobium, titanium and zirconium or a solid solution of these with another metal component.

Any materials that are transmissive at infrared wavelengths may be used as the condensing lenses. ZnSe, GaAs and Ge are preferable. ZnSe is more preferable because it has the highest transmittance at the 10.6 μm wavelength.

The carbonitride mixture particles or the oxycarbonitride mixture particles produced in the reaction zone are collected through the product outlet. The carbonitride mixture particles or the oxycarbonitride mixture particles may be collected more efficiently by suction which is drawn past the outlet exit by means of a vacuum pump such as a dry pump or a rotary pump.

[Overall Structure 2 of Laser Pyrolysis Apparatus]

Figure 2:
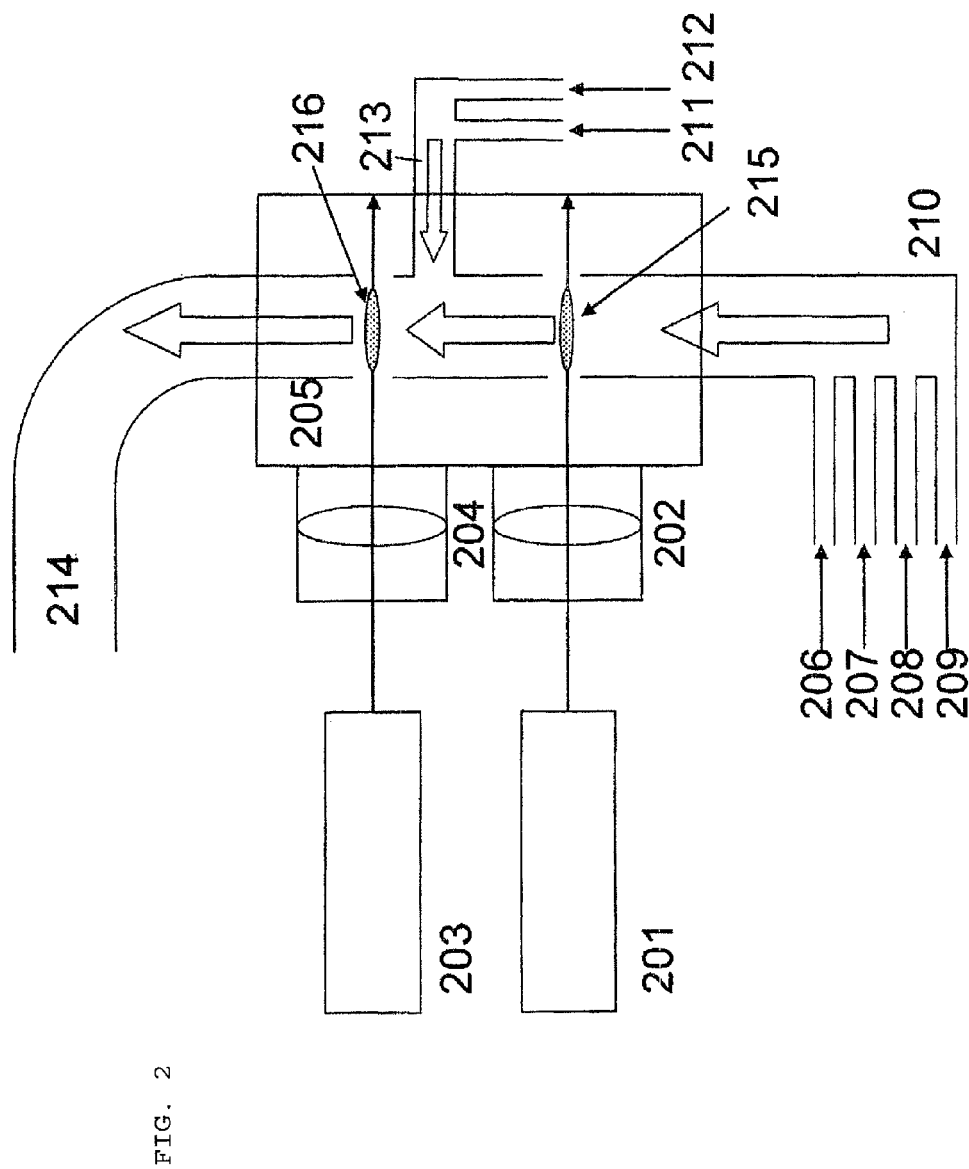
FIG. 2 is a schematic view of an example of a laser pyrolysis apparatus.

FIG. 2 is a schematic view showing another embodiment of a laser pyrolysis apparatus used in the production process of the invention. This apparatus uses two laser, lights as heat sources. In FIG. 2, the numeral 201 indicates a first laser, 202 a first condensing lens, 203 a second laser, 204 a second condensing lens, 205 a chamber, 206 a first carrier gas inlet, 207 a metal compound material inlet, 208 a carbon source inlet, 209 a nitrogen source inlet, 210 a reaction gas inlet, 211 a second carrier gas inlet, 212 an oxygen source inlet, 213 a reactive gas inlet, 214 a product outlet, 215 a first reaction zone, and 216 a second reaction zone.

In this laser pyrolysis apparatus, a carrier gas is introduced from the first carrier gas inlet 206, a metal compound material is fed from the metal compound material inlet 207, and a carbon source and a nitrogen source are introduced from the carbon source inlet 208 and the nitrogen source inlet 209, respectively. They are mixed together at the reaction gas inlet 210 to form a first reaction gas, which is supplied into the chamber 205. Laser light emitted from the first laser 201 passes through the first condensing lens 202 and irradiates the first reaction gas in the chamber 205. The first reaction zone 215 is defined by a portion of the first reaction gas which is being irradiated with the laser light. At the reaction zone 215, the first reaction gas is heated by the laser light as a heat source and generates carbonitride mixture particles in the first reaction gas. On the other hand, a carrier gas is introduced from the second carrier gas inlet 211, and an oxygen source is introduced from the oxygen source inlet 212. They are mixed together at the reactive gas inlet 213 to form a reactive gas, which is supplied into the chamber 205. The reactive gas supplied into the chamber 205 joins the first reaction gas containing the carbonitride mixture particles, and they form a second reaction gas. Laser light emitted from the second laser 203 passes through the second condensing lens 204 and irradiates the second reaction gas in the chamber 205. The second reaction zone 216 is defined by a portion of the second reaction gas which is being irradiated with the laser light. At the reaction zone 216, the second reaction gas is heated by the laser light as a heat source and generates oxycarbonitride mixture particles. The oxycarbonitride mixture particles are delivered outside the chamber 205 through the product outlet 214.

The lasers, the condensing lenses, the chamber, the carrier gas inlets, the metal compound material gas inlet, the nitrogen source gas inlet, the reaction gas inlets and the product outlet basically have the same purposes as those described in FIG. 1.

In the present invention, oxycarbonitride mixture particles may be synthesized from the organometallic compound, the metal salt or the mixture thereof in one stage. It is more preferable, however, that carbonitride mixture particles are synthesized first from the organometallic compound, the metal salt or the mixture thereof, and oxycarbonitride mixture particles are synthesized by reacting the carbonitride mixture particles with the oxygen source. According to this preferred embodiment, the obtainable oxycarbonitride mixture particles have a uniform composition and high crystallinity.

It is known that the minimum temperature in the synthesis of carbonitride mixture particles is different from that in the synthesis of oxycarbonitride mixture particles. In general, inorganic synthesis reactions can result in sintered products if the synthesis is performed at a higher temperature or for a longer time than required to obtain the target substances. Possible results are a reduced specific surface area of particles and deteriorated particle properties, and the products may require a milling step.

Laser heating can apply as much heat as desired for as long as required and permits rapid quenching, and is therefore a valuable tool for the synthesis of carbonitride mixture particles or oxycarbonitride mixture particles. However, it is more preferable that the step for synthesizing carbonitride mixture particles is separate in the furnace from the step of oxidizing the particles to oxycarbonitride mixture particles.

Similarly in FIG. 1, the carrier gas, the metal compound material, the carbon source and the nitrogen source are introduced and reacted together at the reaction zone 215 to give carbonitride mixture particles. In an embodiment, two or more kinds of the metal compound materials may be introduced to the reaction zone 215 to produce carbonitride mixture particles containing a plurality of metals.

The carbonitride mixture particles may be oxidized to oxycarbonitride mixture particles at the reaction zone 216 by introducing the carrier gas and the oxygen source thereto.

Figure 3:
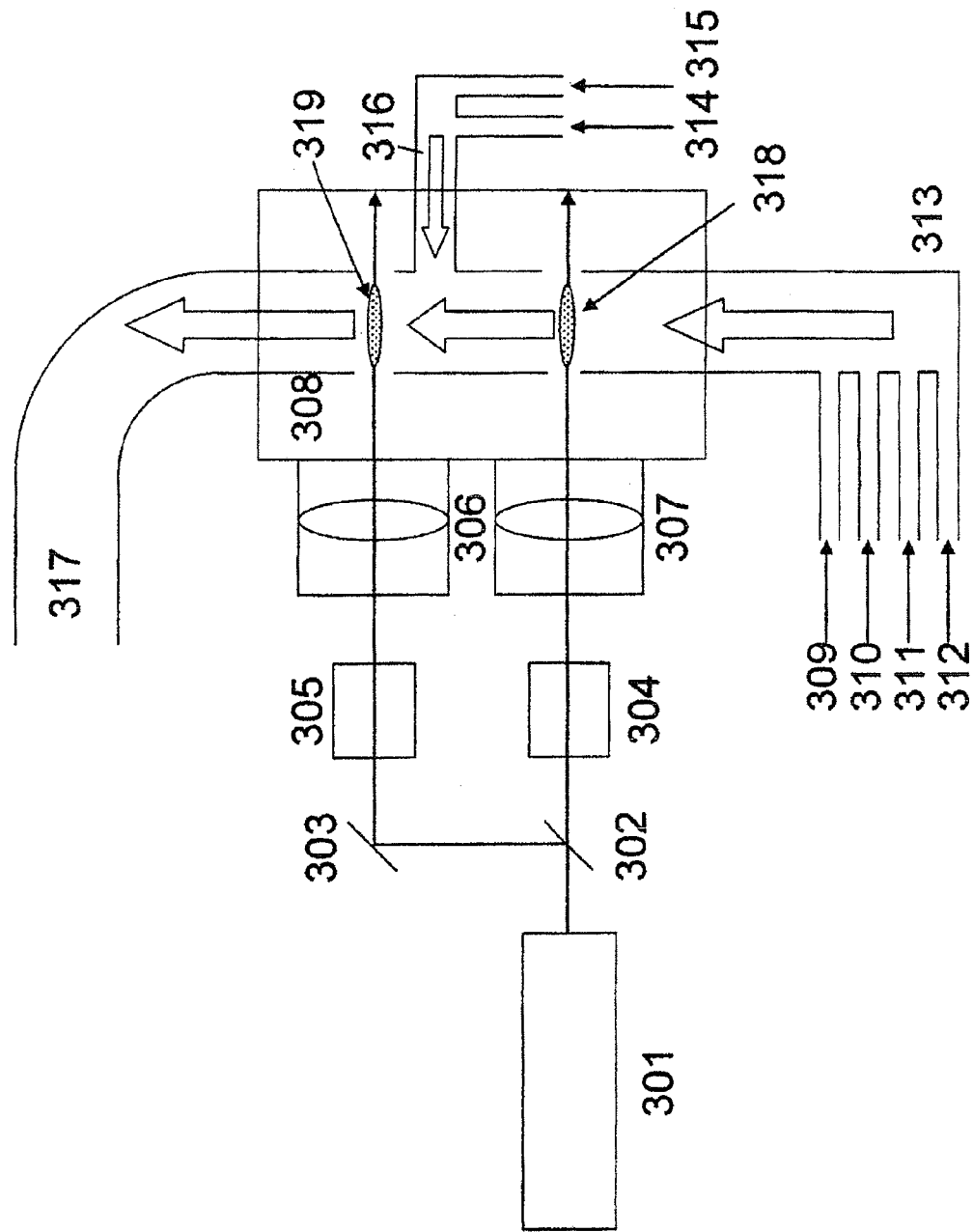
FIG. 3 is a schematic view of an example of a laser pyrolysis apparatus.

In FIG. 2, laser lights are emitted from the respective lasers to the reaction zone 215 and the reaction zone 216. In another embodiment, laser light emitted from a laser may be split into two laser lights. In such embodiments, attenuators are preferably provided after the splitter to control the powers individually. FIG. 3 schematically illustrates an embodiment in which laser light emitted from a single laser is split.

In FIG. 3, the numeral 301 indicates a laser, 302 a laser beam splitter, 303 a reflecting mirror, 304 a first attenuator, 305 a second attenuator, 306 a first condensing lens, 307 a second condensing lens, 308 a chamber, 309 a first carrier gas inlet, 310 a metal compound material inlet, 311 a carbon source inlet, 312 a nitrogen source inlet, 313 a reaction gas inlet, 314 a second carrier gas inlet, 315 an oxygen source inlet, 316 a reactive gas inlet, 317 a product outlet, 318 a first reaction zone, and 319 a second reaction zone.

When two reaction zones are provided, the oxygen source is preferably oxygen or water because oxygen-containing organic compounds do not serve as oxygen sources effectively at low temperatures and the material usage rate is lowered. Water is more preferable than oxygen for the reasons that water is more inexpensive and the reaction rate is lower with water than with oxygen to facilitate reaction control in the entire furnace, resulting in more uniform oxycarbonitride mixture particles.

In one embodiment, three or more laser lights as heat sources may be used, and three or more reaction zones may be provided. Three or more reaction zones allow for the production of carbonitride mixture particles or oxycarbonitride mixture particles having more complex particle diameters or element ratios.

EXAMPLES

The processes for producing carbonitride mixture particles or oxycarbonitride mixture particles according to the present invention will be described in detail by presenting examples hereinbelow without limiting the scope of the invention.

Example 1

Carbonitride mixture particles were produced using a laser pyrolysis apparatus as illustrated in FIG. 1 under the following conditions. Into a 0.1 m$^3$ volume chamber, there were fed 20000 sccm (sccm=standard cubic centimeter per minute) of nitrogen as a carrier gas preheated to 200° C., 1000 sccm of methane as a carbon source preheated to 200° C., 5000 sccm of ammonia as a nitrogen source preheated to 200° C., and 2 g (10.5 mmol) per minute of titanium tetrachloride as a metal compound material preheated to 200° C. The chamber pressure was 200 Torr.

The laser used was a $CO_2$ laser, and the power was 1200 W. The laser light was focused to the reaction zone using a condensing lens. The titanium-containing carbonitride mixture particles generated at the reaction zone were collected through an outlet connected with a dry pump. The carbonitride mixture particles had an average particle diameter of 25 nm. The particle diameter distribution was σ=2 nm.

The sample obtained had a composition ratio of $Ti_{1.0}C_{0.15}N_{0.35}$.

Example 2

Oxycarbonitride mixture particles were produced using a laser pyrolysis apparatus as illustrated in FIG. 2 under the following conditions. Into a 0.2 m$^3$ volume chamber having two reaction zones, there were fed 30000 sccm of nitrogen as a carrier gas preheated to 200° C., 7000 sccm of ammonia as a nitrogen source preheated to 200° C., and 4 g (17.5 mmol) per minute of titanium ethoxide as a metal compound material preheated to 200° C.

Laser light was emitted from a CO$_2$ laser at a power of 1200 W and was focused to the first reaction zone using a condensing lens.

Further, 10000 sccm of nitrogen as a carrier gas preheated to 200° C. and 1 g per minute of water as an oxygen source were supplied to the second reaction zone. Laser light was emitted from a CO$_2$ laser at a power of 1100 W and was focused to the second reaction zone using a condensing lens.

The chamber pressure was 200 Torr.

The titanium-containing oxycarbonitride mixture particles generated at the second reaction zone were collected through an outlet connected with a dry pump. The oxycarbonitride mixture particles had an average particle diameter of 15 nm. The particle diameter distribution was σ=2 nm.

Figure 4:
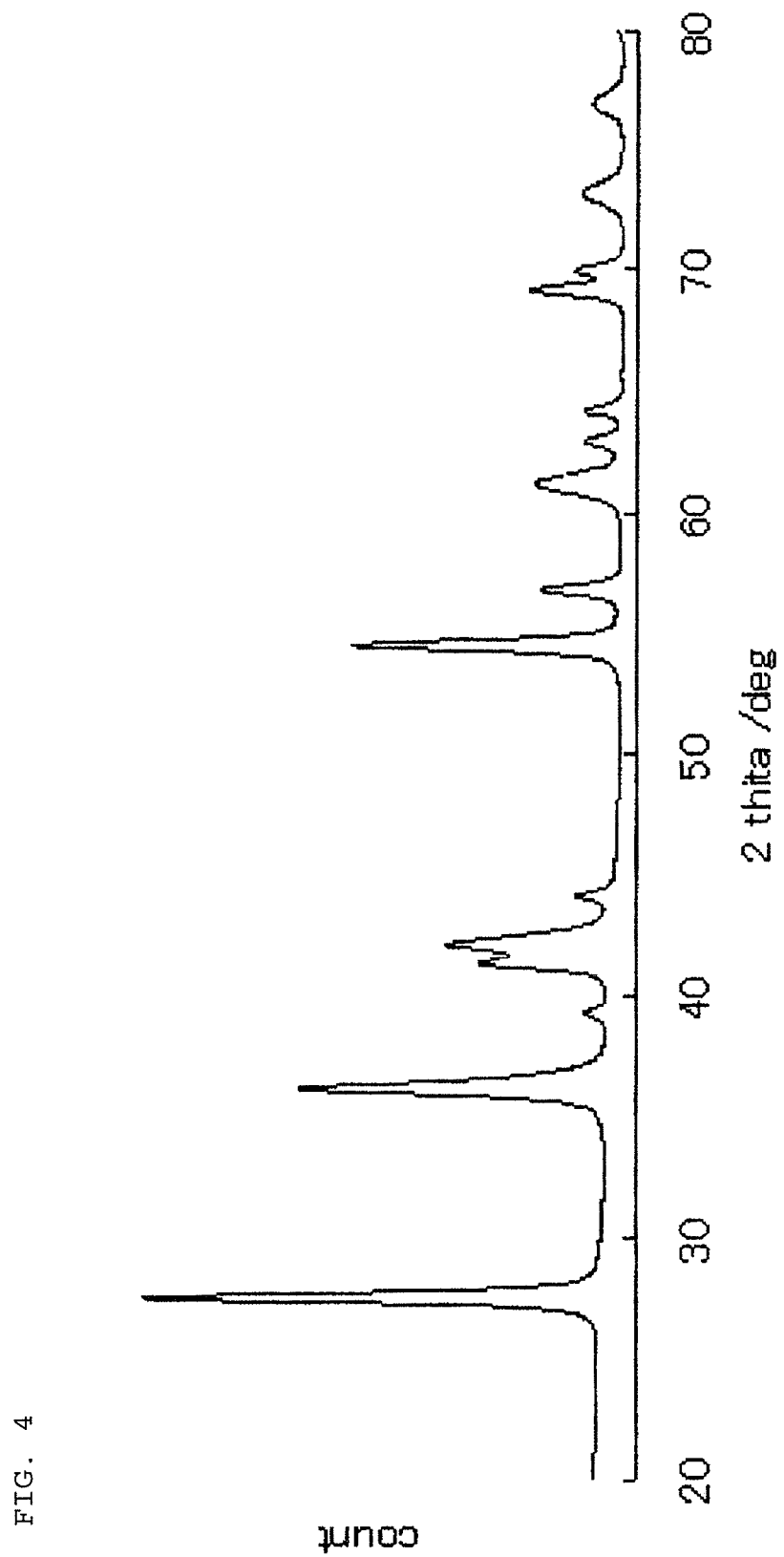
FIG. 4 shows an XRD pattern of titanium-containing oxycarbonitride mixture particles obtained in Example 2.

The titanium-containing oxycarbonitride mixture particles obtained had a composition ratio of Ti$_{1.00}$C$_{0.08}$N$_{0.04}$O$_{1.40}$. An XRD pattern thereof is shown in FIG. 4.

Example 3

Oxycarbonitride mixture particles were produced using a laser pyrolysis apparatus as illustrated in FIG. 2 under the following conditions. Into a 0.2 m$^3$ volume chamber having two reaction zones, there were fed 30000 sccm of nitrogen as a carrier gas preheated to 200° C., 21000 sccm of ammonia as a nitrogen source preheated to 200° C., and 6 g (18.9 mmol) per minute of niobium ethoxide as a metal compound material preheated to 200° C. Laser light was emitted from a CO$_2$ laser at a power of 1200 W and was focused to the first reaction zone using a condensing lens.

Further, 10000 sccm of hydrogen as a carrier gas and 1 g per minute of water as an oxygen source were supplied to the second reaction zone. Laser light was emitted from a CO$_2$ laser at a power of 1100 W and was focused to the second reaction zone using a condensing lens.

The chamber pressure was 200 Torr.

The niobium-containing oxycarbonitride mixture particles generated at the second reaction zone were collected through an outlet connected with a dry pump. The oxycarbonitride mixture particles had an average particle diameter of 20 nm. The particle diameter distribution was σ=3 nm.

Example 4-1

Oxycarbonitride mixture particles were produced using a laser pyrolysis apparatus as illustrated in FIG. 2 under the following conditions. Into a 0.2 m$^3$ volume chamber having two reaction zones, there were fed 30000 sccm of argon as a carrier gas preheated to 200° C., 21000 sccm of ammonia as a nitrogen source preheated to 200° C., and 7 g (18.2 mmol) per minute of zirconium tertiary butoxide as a metal compound material preheated to 200° C. Laser light was emitted from a CO$_2$ laser at a power of 1200 W and was focused to the first reaction zone using a condensing lens.

Further, 10000 sccm of argon as a carrier gas preheated to 200° C. and 100 sccm of oxygen as an oxygen source preheated to 200° C. were supplied to the second reaction zone. Laser light was emitted from a CO$_2$ laser at a power of 800 W and was focused to the second reaction zone using a condensing lens.

The chamber pressure was 200 Torr.

The zirconium-containing oxycarbonitride mixture particles generated at the second reaction zone were collected through an outlet connected with a dry pump. The oxycarbonitride mixture particles had an average particle diameter of 30 nm. The particle diameter distribution was =2 nm.

Example 4-2

Production of Electrode for Evaluation of Oxygen Reducing Ability

The zirconium-containing oxycarbonitride mixture particles from (Example 4-1) in an amount of 0.095 g and carbon (XC-72 manufactured by Cabot Corporation) weighing 0.005 g were added to 10 g of a solution consisting of isopropyl alcohol:pure water=1:1 by weight. The mixture was ultrasonically stirred to give a suspended mixture. The mixture in a volume of 20 μl was applied on a glassy carbon electrode (diameter: 5.2 mm, manufactured by Tokai Carbon Co., Ltd.) and was dried at 120° C. for 1 hour. The application and drying procedures were repeated 3 times. Further, 10 μl of NAFION (a 5% NAFION solution (DE521) manufactured by Du Pont Kabushiki Kaisha) diluted ten times with pure water was applied and was dried at 120° C. for 1 hour. A fuel cell electrode was thus manufactured.

Example 4-3

Evaluation of Oxygen Reducing Ability

The fuel cell electrode manufactured in (Example 4-2) was evaluated for catalytic ability (oxygen reducing ability) as described below.

The fuel cell electrode was polarized in a 0.5 mol/dm$^3$ sulfuric acid solution at 30° C. under an oxygen atmosphere or a nitrogen atmosphere at a potential scanning rate of 5 mV/sec, thereby recording current-potential curves. As a reference, a reversible hydrogen electrode was polarized in a sulfuric acid solution of the same concentration.

From the measurement results, the potential at which the reduction current started to differ by 1.0 μA/cm$^2$ or more between the polarization under the oxygen atmosphere and that under the nitrogen atmosphere was obtained as the oxygen reduction onset potential. The difference between the reduction currents was obtained as the oxygen reduction current.

The catalytic ability (oxygen reducing ability) of the fuel cell electrode was evaluated based on the oxygen reduction onset potential and the oxygen reduction current.

The higher the oxygen reduction onset potential and the higher the oxygen reduction current, the higher the catalytic ability (oxygen reducing ability) of the fuel cell electrode.

Figure 5:
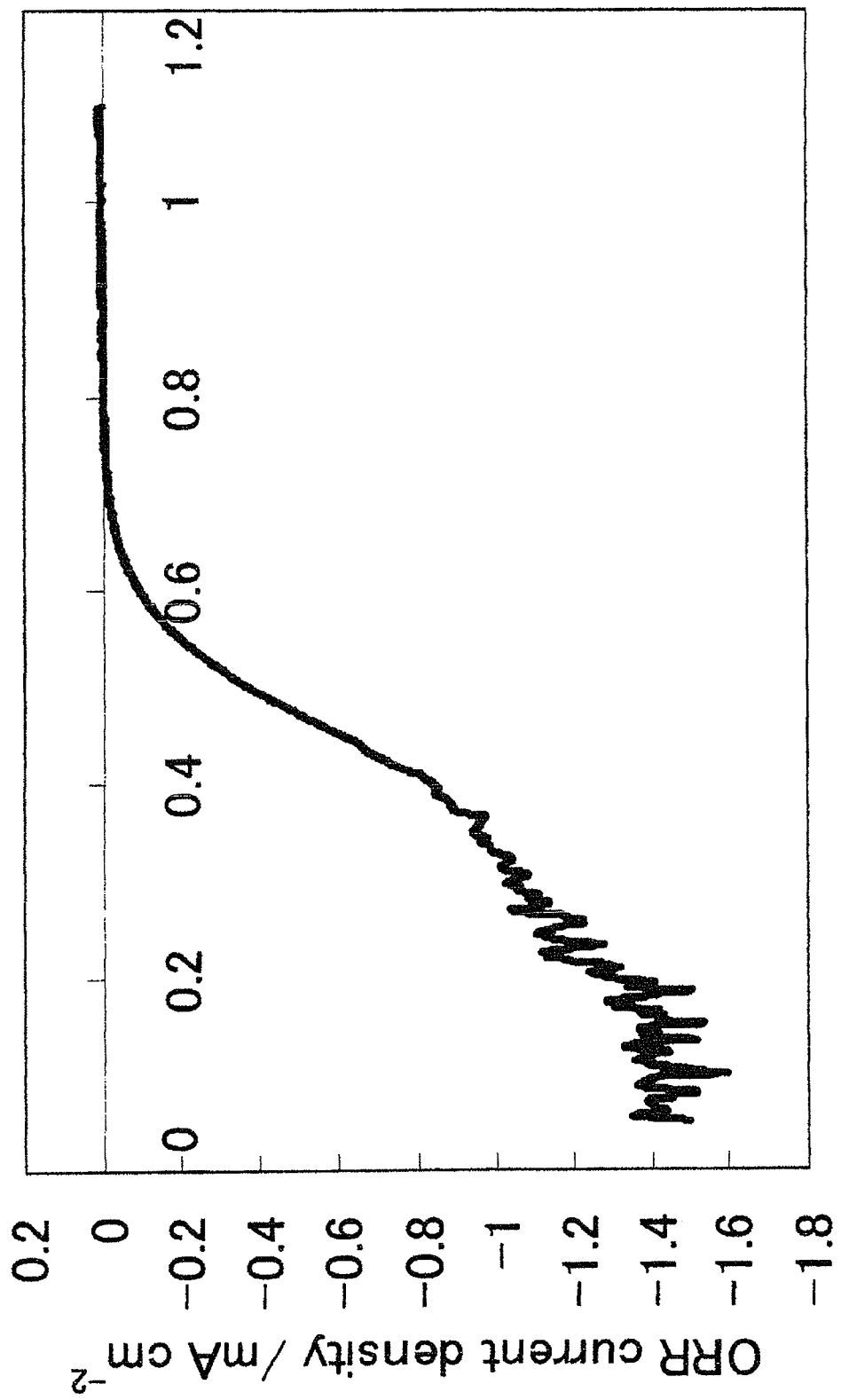
FIG. 5 is a current-potential curve of a fuel cell electrode manufactured in Example (4-2).

FIG. 5 shows a current-potential curve obtained by subtracting the current at nitrogen saturation from the current at oxygen saturation. Namely, the curve is a current potential curve based on the oxygen reduction current.

The fuel cell electrode manufactured in Example 4 had an oxygen reduction onset potential of 0.81 V (vs. NHE) and was found to have high oxygen reducing ability.

Comparative Example 1-1

Zirconium oxide (manufactured by Wako Pure Chemical Industries, Ltd.) in an amount of 1.2 g and carbon black (XC72 manufactured by Cabot Corporation) were mixed together sufficiently. The mixture was placed in a boron nitride crucible and was heated in a graphite furnace (HI-MULTI 5000 manufactured by Fujidempa Kogyo Co., Ltd.) under a stream of nitrogen at 2000° C. for 3 hours, thereby producing 1.1 g of a zirconium-containing carbonitride mixture. While the carbonitride mixture was still in the crucible, it was introduced to a Siliconit furnace 60 mm in inner diameter. The temperature was increased to 1000° C. in an argon atmosphere. After the temperature increase, oxygen was fed at 1% by volume relative to the argon. The oxygen feed was continued for 1 hour at a constant temperature of 1000° C. The product was gradually cooled in argon. As a result, 1.1 g of a zirconium-containing oxycarbonitride mixture was obtained. The oxycarbonitride mixture had a particle diameter of 600 nm.

The oxycarbonitride mixture obtained was placed in an agate container together with 20 g of 0.3 mm diameter zirconia beads and 8 ml of ethanol. The mixture was then milled for 30 minutes in a planetary ball mill (PM-100 manufactured by RETSCH) at a revolution of 500 rpm and a rotation of 1000 rpm. Thus, a zirconium-containing oxycarbonitride mixture having an average particle diameter of 40 nm was obtained.

Comparative Example 1-2

A fuel cell electrode was manufactured in the same manner as in (Example 4-2), except that the zirconium-containing oxycarbonitride mixture particles synthesized in (Example 4-1) were replaced by the zirconium-containing oxycarbonitride mixture synthesized in (Comparative Example 1-1).

Comparative Example 1-3

The oxygen reducing catalytic ability was evaluated in the same manner as in (Example 4-3), except that the electrode manufactured in (Example 4-2) was replaced by the electrode produced in (Comparative Example 1-2).

Figure 6:
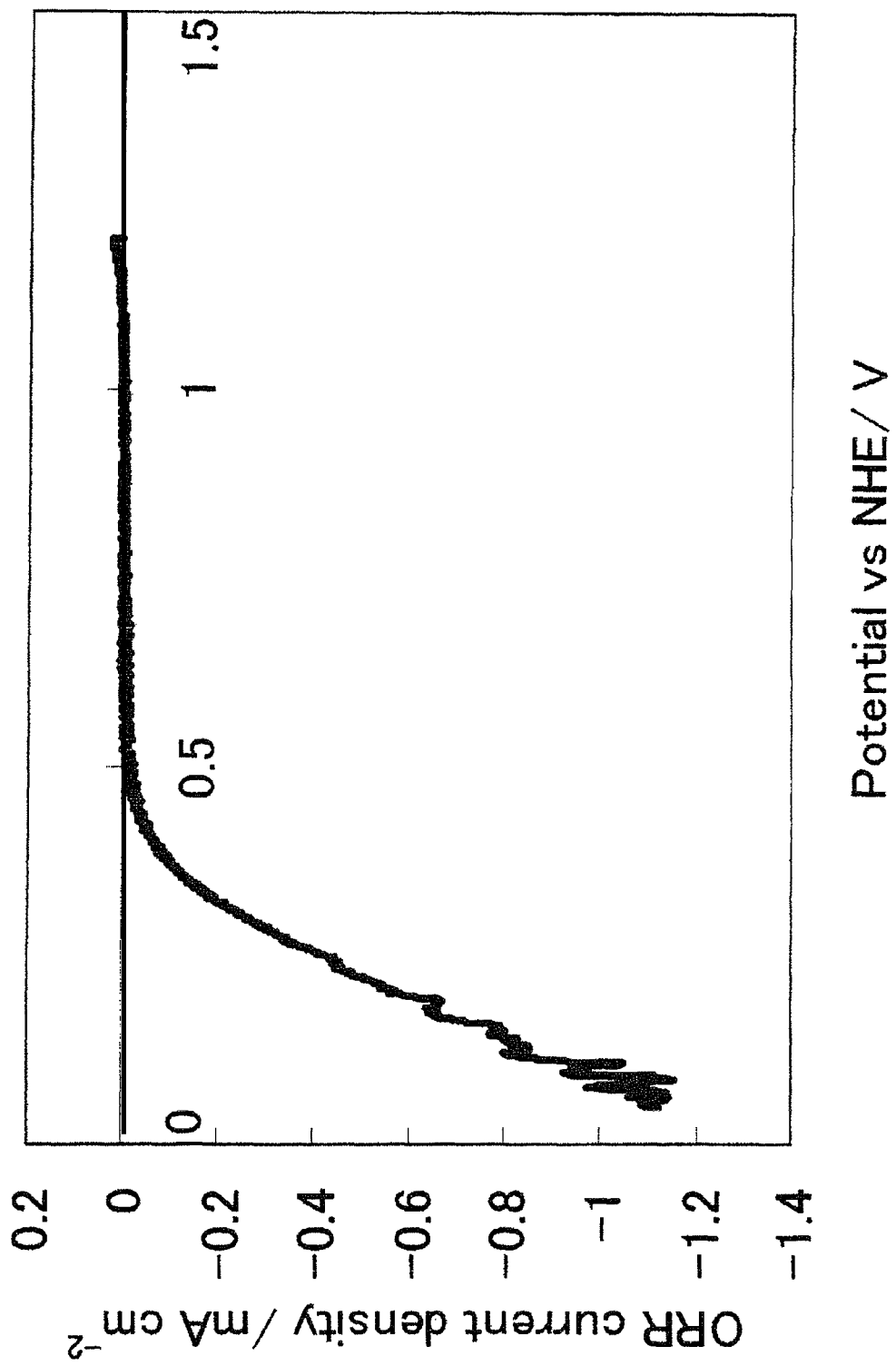
FIG. 6 is a current-potential curve of a fuel cell electrode manufactured in Comparative Example (1-2).

FIG. 6 shows a current potential curve based on the oxygen reduction current. The fuel cell electrode manufactured in Comparative Example 1 had an oxygen reduction onset potential of 0.62 V (vs. NHE).

INDUSTRIAL APPLICABILITY

The carbonitride mixture particles or the oxycarbonitride mixture particles obtained by the production processes of the invention have small particle diameters of 1 to 100 nm and a uniform particle size distribution and a uniform composition distribution. The particles exhibit excellent properties as various catalysts, in particular fuel cell catalysts.

The invention claimed is:

1. A process for producing metal carbonitride mixture particles or metal oxycarbonitride mixture particles, wherein a reaction gas obtained by mixing an organometallic compound or a metal salt of a Group IV or V transition metal, or a mixture of these compounds, with a nitrogen source and optionally a carbon source and an oxygen source as required, and with a diluent gas, is heated to produce carbonitride mixture particles or oxycarbonitride mixture particles of the metal, and wherein the heating involves laser light as a heat source, and wherein the organometallic compound is at least one selected from the group consisting of alkyl metals, metal alkoxides, metal chelates and metal carbonyls, and the metal salt is at least one selected from the group consisting of acetate salts, nitrate salts, sulfate salts, carbonate salts and ammonium carbonate salts.

2. The process for producing metal carbonitride mixture particles or metal oxycarbonitride mixture particles according to claim 1, wherein two or more laser lights are used as heat sources.

3. The process for producing metal carbonitride mixture particles or metal oxycarbonitride mixture particles according to claim 2, wherein carbonitride mixture particles are formed by heating with first laser light, and thereafter the carbonitride mixture particles are reacted with the oxygen source by heating with second laser light to give oxycarbonitride mixture particles.

4. The process for producing metal carbonitride mixture particles or metal oxycarbonitride mixture particles according to claim 1, wherein the carbonitride mixture particles or the oxycarbonitride mixture particles produced have an average particle diameter of 1 to 100 nm.

5. The process for producing metal carbonitride mixture particles or metal oxycarbonitride mixture particles according to claim 1, wherein the Group IV or V transition metal is at least one selected from the group consisting of niobium, titanium and zirconium.

6. The process for producing metal carbonitride mixture particles or metal oxycarbonitride mixture particles according to claim 1, wherein the carbon source is at least one selected from the group consisting of fine carbon powders, hydrocarbons, alcohols, ketones, aldehydes, carboxylic acids and nitriles.

7. The process for producing metal carbonitride mixture particles or metal oxycarbonitride mixture particles according to claim 1, wherein the nitrogen source is at least one selected from the group consisting of ammonia, nitrogen, hydrazine and nitriles.

8. The process for producing metal carbonitride mixture particles or metal oxycarbonitride mixture particles according to claim 1, wherein the oxygen source is at least one selected from the group consisting of oxygen, water, alcohols, ketones, aldehydes and carboxylic acids.

9. The process for producing metal carbonitride mixture particles or metal oxycarbonitride mixture particles according to claim 1, wherein the diluent gas is argon, nitrogen, hydrogen or a mixture thereof.

10. A process for producing metal carbonitride mixture particles or metal oxycarbonitride mixture particles, wherein a reaction gas obtained by mixing an organometallic compound or a metal salt of a Group IV or V transition metal, or a mixture of these compounds, with a nitrogen source and optionally a carbon source and an oxygen source as required, and with a diluent gas, is heated to produce carbonitride mixture particles or oxycarbonitride mixture particles of the metal, and wherein the heating involves laser light as a heat source, wherein carbonitride mixture particles are formed by heating with first laser light, and thereafter the carbonitride mixture particles are reacted with the oxygen source by heating with second laser light to give oxycarbonitride mixture particles.

11. A process for producing metal carbonitride mixture particles or metal oxycarbonitride mixture particles, wherein a reaction gas obtained by mixing an organometallic compound or a metal salt of a Group IV or V transition metal, or a mixture of these compounds, with a nitrogen source and optionally a carbon source and an oxygen source as required, and with a diluent gas, is heated to produce carbonitride mixture particles or oxycarbonitride mixture particles of the metal, and wherein the heating involves laser light as a heat source, wherein the oxygen source is at least one selected from the group consisting of oxygen, water, alcohols, ketones, aldehydes and carboxylic acids.

* * * * *